United States Patent
Samadani et al.

(10) Patent No.: US 7,643,688 B2
(45) Date of Patent: Jan. 5, 2010

(54) REDUCING ARTIFACTS IN COMPRESSED IMAGES

(75) Inventors: Ramin Samadani, Menlo Park, CA (US); Arvind Sundararajan, Palo Alto, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1183 days.

(21) Appl. No.: 10/683,322

(22) Filed: Oct. 10, 2003

(65) Prior Publication Data
US 2005/0078872 A1 Apr. 14, 2005

(51) Int. Cl.
*G06K 9/36* (2006.01)
*G06K 9/40* (2006.01)

(52) U.S. Cl. .................................. 382/232; 382/268
(58) Field of Classification Search ............. 382/275, 382/264, 268
See application file for complete search history.

(56) References Cited

U.S. PATENT DOCUMENTS

| | | | |
|---|---|---|---|
| 4,754,492 A | 6/1988 | Malvar | |
| 5,046,121 A * | 9/1991 | Yonekawa et al. | 382/250 |
| 5,311,305 A * | 5/1994 | Mahadevan et al. | 348/169 |
| 5,359,676 A * | 10/1994 | Fan | 382/246 |
| 5,454,051 A | 9/1995 | Smith | |
| 5,526,446 A * | 6/1996 | Adelson et al. | 382/275 |
| 5,737,451 A * | 4/1998 | Gandhi et al. | 382/268 |
| 5,940,536 A * | 8/1999 | Wake et al. | 382/205 |
| 5,974,197 A * | 10/1999 | Lee et al. | 382/268 |
| 6,047,039 A * | 4/2000 | Flohr | 378/4 |
| 6,175,596 B1 * | 1/2001 | Kobayashi et al. | 375/240.27 |
| 6,317,522 B1 * | 11/2001 | Rackett | 382/268 |
| 6,427,031 B1 | 7/2002 | Price | |
| 6,563,964 B1 | 5/2003 | Hallberg | |
| 6,594,400 B1 * | 7/2003 | Kim | 382/268 |
| 6,748,113 B1 * | 6/2004 | Kondo et al. | 382/232 |
| 7,027,661 B2 * | 4/2006 | Estevez et al. | 382/275 |
| 7,031,552 B2 * | 4/2006 | Kim | 382/275 |
| 7,139,437 B2 * | 11/2006 | Jones et al. | 382/261 |
| 2003/0053711 A1 * | 3/2003 | Kim | 382/268 |

(Continued)

FOREIGN PATENT DOCUMENTS

EP 0626790 11/1994

(Continued)

OTHER PUBLICATIONS

XP-001116260 Enhancement of JPEG compressed images by re-application of JPEG Journal of VLSI signal processing 27, 69-79,2001.*

(Continued)

*Primary Examiner*—Brian P Werner
*Assistant Examiner*—Jayesh Patel

(57) ABSTRACT

Systems and methods of reducing artifacts in compressed images are described. In one aspect, spatially-shifted forward transforms of the input image are computed to generate respective sets of forward transform coefficients. Nonlinear transforms are applied to the forward transform coefficients of each set. Inverse transforms of the sets of nonlinearly transformed forward transform coefficients are computed to generate respective intermediate images. Respective measures of local spatial intensity variability are computed for pixels of each of the intermediate images. An output image is computed with pixel values computed based at least in part on the computed measures of local spatial intensity variability.

39 Claims, 4 Drawing Sheets

U.S. PATENT DOCUMENTS

2003/0081854 A1* 5/2003 Deshpande .................. 382/261
2004/0091168 A1* 5/2004 Jones et al. .................. 382/261
2004/0208389 A1* 10/2004 Lin ............................ 382/260

FOREIGN PATENT DOCUMENTS

EP            1003334            5/2000

OTHER PUBLICATIONS

XP-001116260 Nosratinia Enhancement of JPEG- Compressed Images by reapplication of JPEG.*

Enhancement of JPEG-compressed images by reapplication of JPEG, Aria Nosratinia, XP-001116260,VLSI signal processing 27 pp. 69-79, 2001.*

Wing-Kuen Ling et al: "A Novel Method for Blocking Effect Reduction in DCT-Coded Images" Dept of Electrical & Electronic Eng. The HK Uni of Science and Tech. pp. IV46-IV49, IEEE 1999.

A. Nosratinia, "Enhancement of JPEG-Compressed images by re-application of JPEG," Journal of VLSI Signal Processing, vol. 27, pp. 69-79, 2001.

Eero P. Simoncelli, Bayesian Denoising of Visual Images in the Wavelet Domain, Bayesian Inference in Wavelet Based Models, eds. P. Muller et al., Chapter 18, pp. 291-308, Lecture Notes in Statistics, vol. 141, Springer-Verlag, New York, 1999.

* cited by examiner

REDUCING ARTIFACTS IN COMPRESSED IMAGES

TECHNICAL FIELD

This invention relates to systems and methods of reducing artifacts in compressed images.

BACKGROUND

Digital images and video frames are compressed in order to reduce data storage and transmission requirements. In most image compression methods, certain image data is discarded selectively to reduce the amount of data needed to represent the image while avoiding substantial degradation of the appearance of the image.

Transform coding is a common image compression method that involves representing an image by a set of transform coefficients. The transform coefficients are quantized individually to reduce the amount of data that is needed to represent the image. A representation of the original image is generated by applying an inverse transform to the transform coefficients. Block transform coding is a common type of transform coding method. In a typical block transform coding process, an image is divided into small rectangular regions (or "blocks"), which are subjected to forward transform, quantization and coding operations. Many different kinds of block transforms may be used to encode the blocks. Among the common types of block transforms are the cosine transform (which is the most common), the Fourier transform, the Hadamard transform, and the Haar wavelet transform. These transforms produce an M×N array of transform coefficients from an M×N block of image data, where M and N have integer values of at least 1.

The quality of an image often is degraded by a block transform coding process. For example, discontinuities often are introduced at the block boundaries in the reconstructed image and ringing artifacts often are introduced near image boundaries.

Different approaches have been proposed for enhancing compressed images by reducing the appearance of artifacts introduced by block transform coding processes. Among the most common image enhancement approaches are approaches that filter along block boundaries, approaches that optimize by projecting onto convex sets, and approaches that perform wavelet transform thresholding. Another approach for enhancing compressed images involves the reapplication of shifted JEPG transforms to a JPEG image. In particular, this approach re-applies the JPEG compression operator to shifted versions of the already-compressed image and averages all of the resulting images to produce an enhanced output image.

SUMMARY

The invention features systems and methods of reducing artifacts in compressed images.

The invention features systems and methods in which spatially-shifted forward transforms of an input image are computed to generate respective sets of forward transform coefficients. Nonlinear transforms are applied to the forward transform coefficients of each set. Inverse transforms of the sets of transformed forward transform coefficients are computed to generate respective intermediate images. Respective measures of local spatial intensity variability are computed for pixels of each of the intermediate images. An output image is computed with pixel values computed based at least in part on the computed measures of local spatial intensity variability.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Compressing an Original Image

Figure 1:
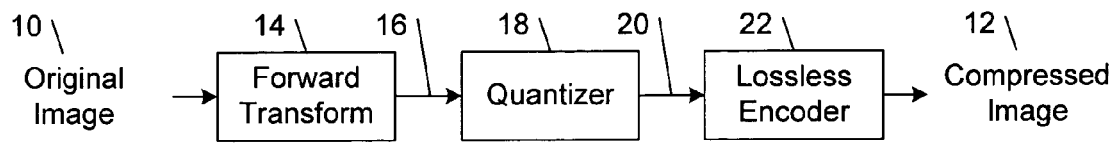
FIG. 1 is a block diagram of a system for compressing an original image.

FIG. 1 shows a prior art method of processing an original image 10 to produce a compressed image 12. In accordance with the illustrated method, a forward transform 14 is applied to the original image 10 to produce a set of forward transform coefficients 16. The forward transform 14 may be any type of transform that is operable to convert the original image 10 into a set of coefficients in a selected domain. A quantizer 18 is applied individually to the forward transform coefficients 16 to produce a set of quantized forward coefficients 20. The quantizer 18 discards some of forward transform coefficient information, enabling the original image 10 to be compressed. An encoder 22 encodes the quantized forward transform coefficients using any type of lossless encoding technique to produce the compressed image 12.

Original image 10 may be a binary image (e.g., a dark and bright dot pattern), a multilevel single-color image (e.g., a gray-level image), or a multilevel multi-color image. In general, the image compression process of FIG. 1 is applied individually to each color plane of the original image 10.

Figure 2:
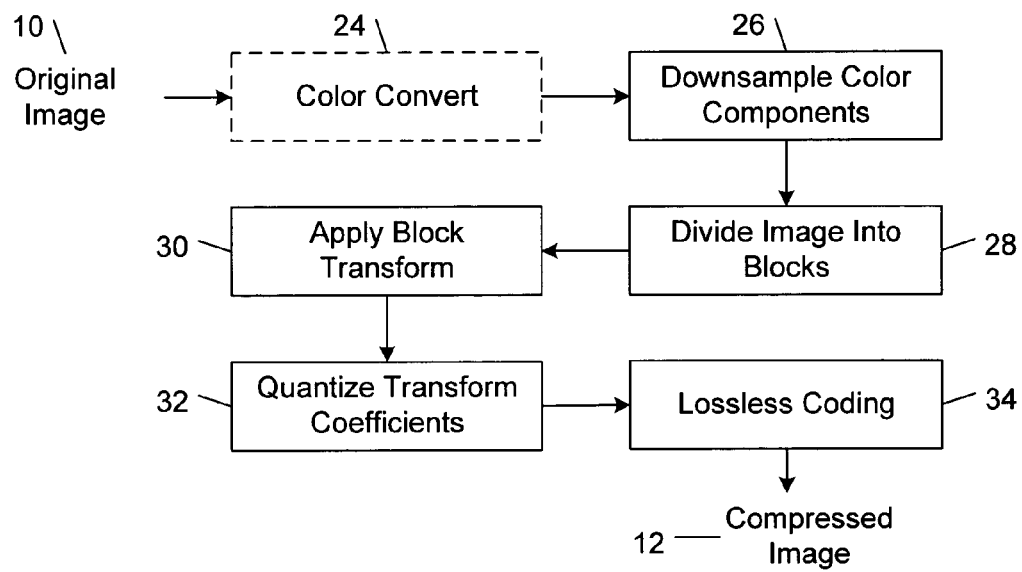
FIG. 2 is a flow diagram of a block-transform-based method of compressing an original image.

FIG. 2 shows a prior art block-transform-based image method of compressing original image 10. In accordance with this method, original image 10 initially is converted into a preselected luminance-based color space (e.g., the YCrCb color space), if the original image 10 is not already specified in the preselected color space (block 24). Each color plane of the image in the preselected color space corresponds to a respective image (i.e., an array of pixel values) that is processed individually as follows. The color components (e.g., the Cr and Cb color components) are downsampled (block 26). Each color plane is divided into blocks of pixels (e.g., 8×8 pixel blocks) (block 28). A block transform is applied to each pixel block individually (block 30). Any kind of block transform may be applied to the blocks. Exemplary types of block transforms include the cosine transform, Fourier transform, Hadamard transform, and Haar wavelet transform. The resulting transform coefficients are quantized (block 32). The quantized transform coefficients are encoded using a lossless coding technique to produce compressed image 12 (block 34).

II. Reducing Artifacts in Compressed Images

The embodiments described below are configured to reduce artifacts inherently introduced by processes that are used to create compressed images. In many instances, these embodiments reduce image compression artifacts without degrading image quality, such as by blurring features in the image. As described in detail below, some implementations of these embodiments are particularly well-suited to substantially reduce ringing and blocking compression artifacts that are introduced by block-transform-based image compression techniques, such as block discrete cosine transform (DCT) image compression techniques.

Figure 3:
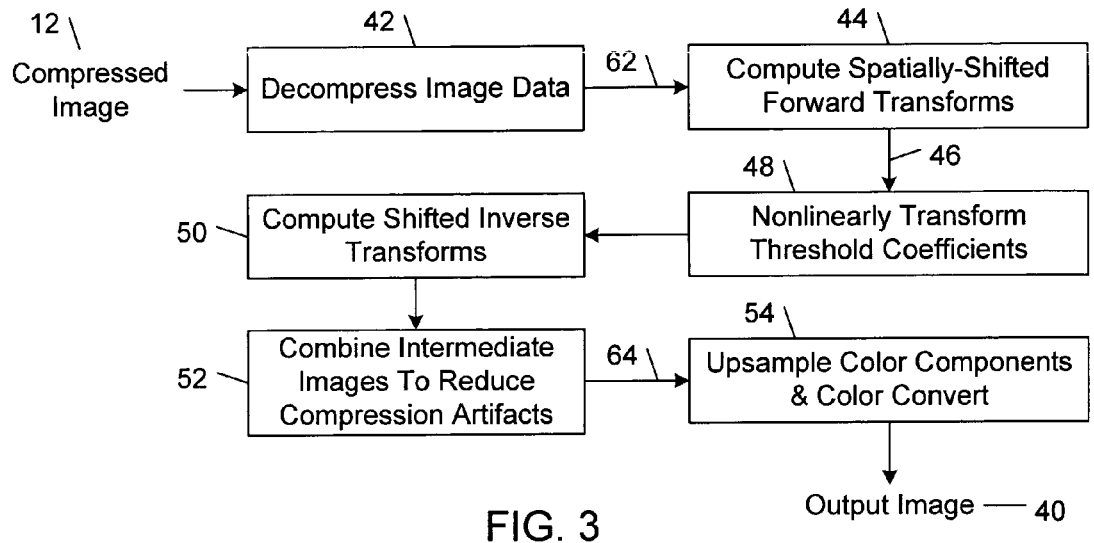
FIG. 3 is a flow diagram of an embodiment of a method of processing a compressed image to produce an output image characterized by reduced compression artifacts.

FIG. 3 shows an embodiment of a method of processing a compressed image 12 that is generated by the block-transform-based image compression method of FIG. 2 to produce an output image 40 with reduced compression artifacts. In this method, each plane of the compressed image 12 is processed individually. The compressed image data initially is decompressed (block 42). Spatially-shifted forward transforms are computed from the decompressed image data 62 (block 44). In this process, a forward transform operation is applied to each of multiple shifted versions of the decompressed image data 62 to produce multiple respective sets of forward transform coefficients 46. For example, in an implementation in which the image 12 is compressed based on blocks of M×N pixels, the forward transform operation is applied to the decompressed image data 62 on a subset containing K shifts from the M×N independent shifts possible in an M×N transform to produce K sets of forward transform coefficients, where K, M, and N have integer values of at least 1. In one exemplary implementation, both M and N have a value of 8.

The forward transform coefficients 46 of each set are nonlinearly transformed (block 48). An inverse transform operation (block 50) is applied to the sets of nonlinearly transformed forward transform coefficients 46 to produce respective intermediate images. As explained in detail below, the intermediate images are combined to reduce compression artifacts in each color plane 64 (block 52). The color component image planes (e.g., Cr and Cb) are upsampled to the original resolution and the resulting image planes are converted back to the color space (e.g., the Red-Green-Blue color space) of the original image 10 (block 54). The image planes are combined to produce the output image 40.

Figure 4:
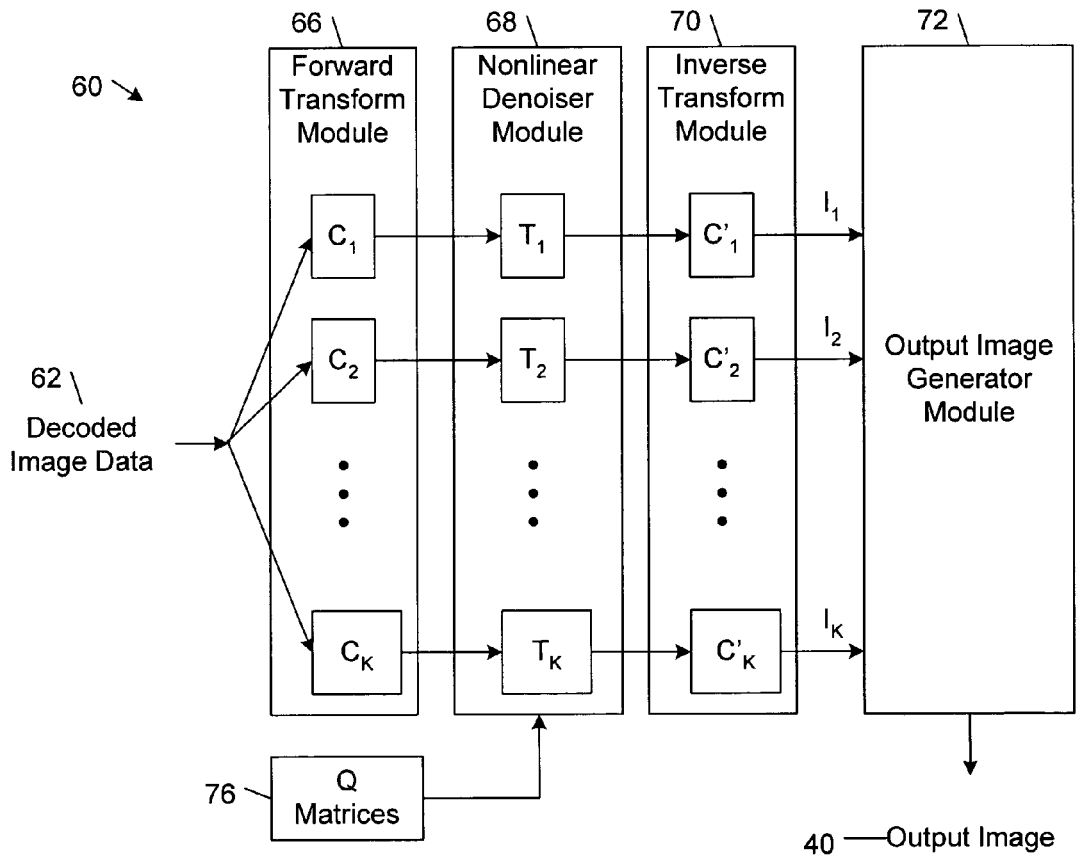
FIG. 4 is a block diagram of an embodiment of an image processing system for implementing output image generator steps in the method of FIG. 3.

FIG. 4 shows an embodiment of a system 60 for processing the decompressed image data 62 generated by the method of FIG. 3 to produce the compression-artifact-reduced output image 40. Processing system 60 includes a forward transform module 66, a nonlinear denoiser module 68, an inverse transform module 70, and an output image generator module 72. In general, the modules 66-72 of system 60 are not limited to any particular hardware or software configuration, but rather they may be implemented in any computing or processing environment, including in digital electronic circuitry or in computer hardware, firmware, device driver, or software. For example, in some implementations, these modules 66-72 may be embedded in the hardware of any one of a wide variety of electronic devices, including digital cameras, printers, and portable electronic devices (e.g., mobile phones and personal digital assistants). In addition, although full (or complete) input images are processed in the illustrated embodiments, other embodiments may be configured to sequentially process a series of sub-image portions (e.g., swaths) of an input image.

The forward transform module 66 computes from the decoded image data 62 K sets ($C_1$, $C_2$, . . . , $C_K$) of shifted forward transform coefficients, corresponding to K unique positions of a blocking grid relative to the compressed image 12. In some implementations, the forward transform module 66 applies the same forward transforms that were used to originally compress image 12.

Figure 5:
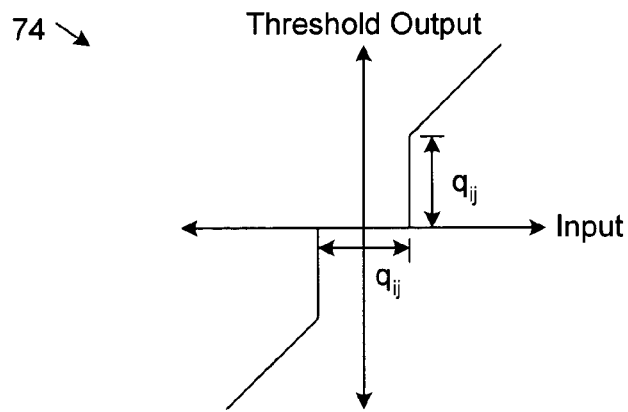
FIG. 5 is a graph of threshold output in an implementation of the nonlinear denoiser module of FIG. 4 plotted as a function of input transform coefficient values.

The nonlinear denoiser module 68 nonlinearly transforms the sets ($C_1$, $C_2$, . . . , $C_K$) of shifted forward transform coefficients that are computed by the forward transform module 66. Referring to FIG. 5, in some implementations, the sets of forward transform coefficients are transformed in accordance with respective nonlinear thresholding transformations ($T_1$, $T_2$, . . . , $T_K$). In particular, the forward transform coefficients are nonlinearly transformed by setting to zero each coefficient with an absolute value below a respective threshold ($q_{ij}$, where i, j refer to the indices of the quantization element, with i having values in the range of 0 to M−1 and j having values in the range of 0 to N−1) and leaving unchanged each coefficient with an absolute value equal to or above a respective threshold ($q_{ij}$). Quantization matrices 76 (or "Q Matrices") are used to set the parameters q for the nonlinear thresholding transformations ($T_1$, $T_2$, . . . , $T_K$). In some implementations, the quantization matrices contain the same quantization parameters $q_{ij}$ that were originally used to compress image 12. These quantization parameters may be stored in the compressed image 12 in accordance with a standard image compression scheme (e.g., JPEG).

In some embodiments, the nonlinear denoiser module 68 incorporates sharpness enhancements by modifying the non-linearities, $T_i$. In particular, nonlinear denoiser module 68 multiplies the nonlinear transform parameter values $q_{ij}$ by gain factors $g_{ij}$. There are many ways to set the gain factors. In one implementation, the gain factors are given by equation (1):

$$g_{ij} = 1.0 + s*(i+j)/14 \qquad (1)$$

where i and j are the indices selecting each quantizer coefficient. In implementations designed for 8×8 blocking grids, the values of i and j are in the range [0-7], with 0 representing the lowest spatial frequency, and 7 representing the highest spatial frequency. The value of sharpness factor, s, determines the amount of sharpening. When s=0, no sharpening is applied. Values of s between 0.5 and 1.5 provide an adequate sharpness range to compensate for slight blurring that might be caused by the output image generator methods. A matrix containing exemplary gain factors computed from equation (1) for s=0.5 is provided in Table 1, below:

TABLE 1

| Gain Factors $g_{ij}$ for s = 0.5 |
|---|
| 1.0000 1.0357 1.0714 1.1071 1.1429 1.1786 1.2143 1.2500 |
| 1.0357 1.0714 1.1071 1.1429 1.1786 1.2143 1.2500 1.2857 |
| 1.0714 1.1071 1.1429 1.1786 1.2143 1.2500 1.2857 1.3214 |
| 1.1071 1.1429 1.1786 1.2143 1.2500 1.2857 1.3214 1.3571 |
| 1.1429 1.1786 1.2143 1.2500 1.2857 1.3214 1.3571 1.3929 |
| 1.1786 1.2143 1.2500 1.2857 1.3214 1.3571 1.3929 1.4286 |
| 1.2143 1.2500 1.2857 1.3214 1.3571 1.3929 1.4286 1.4643 |
| 1.2500 1.2857 1.3214 1.3571 1.3929 1.4286 1.4643 1.5000 |

The inverse transform module 70 computes sets ($C'_1$, $C'_2$, ..., $C'_K$) of inverse transforms from the sets of nonlinearly transformed forward transform coefficients. The inverse transform module 70 applies the inverse of the forward transform operation that is applied by forward transform module 66. The outputs of the inverse transform module 70 are intermediate images ($I_1, I_2, ..., I_K$) representing the image data in the spatial domain.

Figure 6:
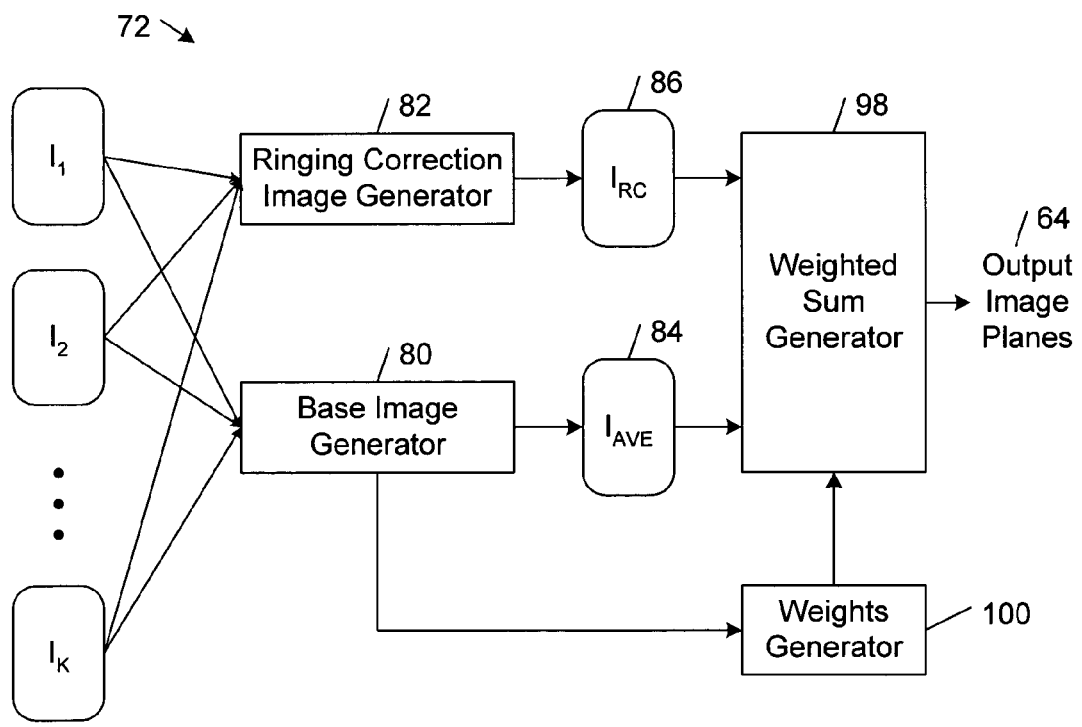
FIG. 6 is a block diagram of an implementation of the output image generator module in of FIG. 4.

The output image generator module 72 combines the intermediate images ($I_1, I_2, ..., I_K$) to form the image planes 64 of the final output image 40. FIG. 6 shows an embodiment of the output image generator module 72 that includes a base image generator 80 and a ringing correction image generator 82.

The base image generator 80 computes a base image 84 corresponding to an estimate of the original uncompressed image from a combination of the intermediate images ($I_1, I_2, ..., I_K$). In the illustrated embodiment, base image generator 80 computes a base image ($I_{AVE}$) that has pixel values corresponding to averages of corresponding pixels in the intermediate images ($I_1, I_2, ..., I_K$).

The ringing correction image generator 82 computes a ringing correction image ($I_{RC}$) based on the intermediate images ($I_1, I_2, ... I_K$). In some implementations, the ringing correction image generator 82 computes a ringing correction image 86 ($I_{RC}$) based at least in part on measures of local spatial intensity variability that are computed for pixels of the intermediate images ($I_1, I_2, ..., I_K$). For example, in a minimum variance de-ringing implementation, the value of a given pixel of the ringing correction image 86 is set to the value of the corresponding intermediate image pixel having the lowest computed measure of spatial intensity variability of all the intermediate image pixels corresponding to the pixel in the ringing correction image 86. In a weighted variance de-ringing approach, each pixel value of the ringing correction image 86 is assigned a value corresponding to an average of multiple corresponding intermediate image pixels in a lowest percentile (e.g., the 30% percentile) of local spatial variability measures of all the intermediate image pixels corresponding to the given pixel in the ringing correction image 86. The weighted variance de-ringing approach has been observed to reduce ringing compression artifacts while avoiding noise that sometimes is introduced by the minimum variance de-ringing approach.

Figure 7:
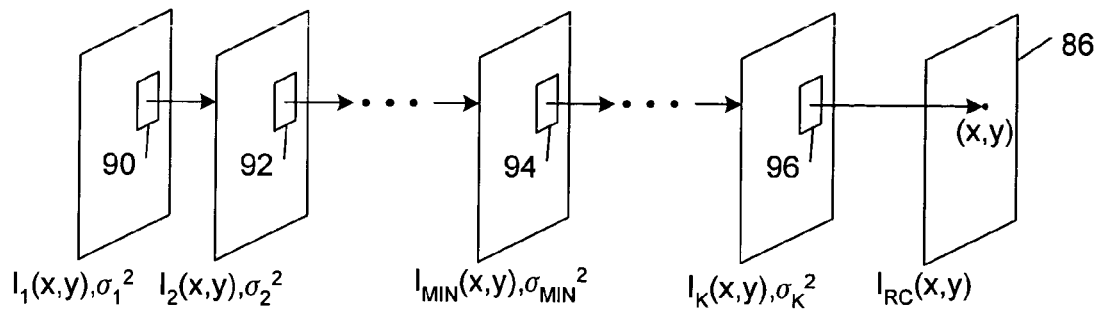
FIG. 7 is a diagrammatic view of a set of intermediate images and a ringing correction image generated from the set of intermediate images.

Referring to FIG. 7, in some embodiments, spatial intensity variability is measured by the spatial variance ($\sigma_1^2, \sigma_2^2, ..., \sigma_K^2$), which is computed for pixels of the intermediate images ($I_1(x,y), I_2(x,y), ..., I_K(x,y)$) corresponding to a given pixel $I_{RC}(x,y)$ in the ringing correction image 86. The spatial variance measures are computed based on respective intermediate image regions defined by respective windows 90, 92, 94, 96. In the illustrated embodiment, the windows 90-96 have dimensions of 3 pixels in width by 3 pixels in height. In one exemplary implementation, the spatial variance for a given intermediate image pixel $I_j(x,y)$ is given by equation (2):

$$\sigma_0^2 = \frac{1}{K} \cdot \sum_{j=1}^{K} (V_j - \langle V \rangle)^2 \qquad (2)$$

where <V> is the average pixel value in the neighborhood of the given pixel $$\left(\text{i.e., } \langle V \rangle = \frac{1}{K} \sum_{i=1}^{K} V_i \right)$$

and K is the number (e.g., nine) of pixels in the neighborhood of the given pixel in the ringing correction image 86. In another exemplary implementation, the spatial variability for a given intermediate image pixel $I_j(x,y)$ with a value $V_0$ is given by equation (3):

$$\Lambda_0^2 = \frac{1}{K} \cdot \sum_{j=1}^{K} (V_j - V_0)^2 \qquad (3)$$

In the illustrated embodiment, the value of the intermediate image pixel (e.g., ($I_{MIN}(x,y)$)) with the smallest computed variance ($\sigma_{MIN}^2$) is assigned to the corresponding pixel ($I_{RC}(x,y)$) in the ringing correction image 86.

It has been observed that the base image 84 is characterized by a substantial reduction in the appearance of compression artifacts, such as blocking artifacts, but in some cases the base image 84 still contains residual ringing artifacts. It also has been observed that the ringing correction image 86 ($I_{RC}$) is characterized by substantially reduced ringing compression artifacts relative to the base image 84, but otherwise is generally more blurry than the base image 84. Based on these observations, the output image generator module 72 is configured to combine the base image 84 and the ringing correction image 86 in ways that substantially reduce the appearance of compression artifacts in the resulting output image 40.

In the embodiment of FIG. 6, the output image generator module 72 includes a weighted sum generator 98 that computes weighted sums of corresponding pixels of the base image 84 ($I_{AVE}(x,y)$) and the ringing correction image 86 ($I_{RC}(x,y)$) to generate the values of the pixels of the output image 40 in accordance with equation (4):

$$I_{OUT}(x,y) = \alpha(x,y) \cdot I_{RC}(x,y) + (1-\alpha(x,y)) \cdot I_{AVE}(x,y) \qquad (4)$$

where $\alpha$ has a value in the range [0,1].

A weights generator module 100 computes the values of $\alpha(x,y)$ for each pixel of the output image 40. In general, for pixels that are sufficiently far from sharp transitions, where the expected ringing is minimal, the weights generator module 100 sets $\alpha(x,y) \simeq 0$. For pixels on a sharp transition, the weights generator module 100 also sets $\alpha(x,y) \simeq 0$ in order to not blur the transition. For pixels that are sufficiently close to (e.g., adjacent to) but not on a sharp transition, the weights generator module 100 sets $\alpha(x,y) \simeq 1$ to reduce the potential ringing.

Figure 8:
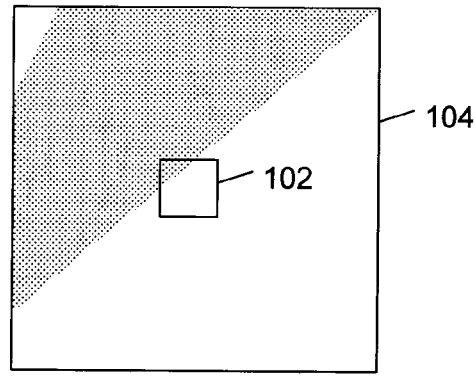
FIG. 8 is a block diagram of a pair of concentric windows used to compute a measure of block contrast and a measure of local contrast from pixel values of a base image.

In some embodiments, the weights generator module 100 computes $\alpha(x,y)$ for a given pixel based on a measure of relative contrast between a local region in a spatial window encompassing the given pixel and a larger region in a spatial window surrounding the local region. In some implementations, image contrast is computed from the pixel range, which is the difference, in a spatial window, between maximum and minimum pixel values. As shown in FIG. 8, in these implementations, the pixel range is calculated for windows 102, 104 of two different sizes. The size of the first window 102 is small (e.g., 3 pixels by 3 pixels) in order to accurately estimate local contrast near edges. In some implementations, the size of the second window 104 (e.g., 15 pixels by 15 pixels) covers all of the shifted block transforms at a given pixel. The pixel range calculations result in a local contrast measure, lc, and a block contrast measure, bc.

Figure 9:
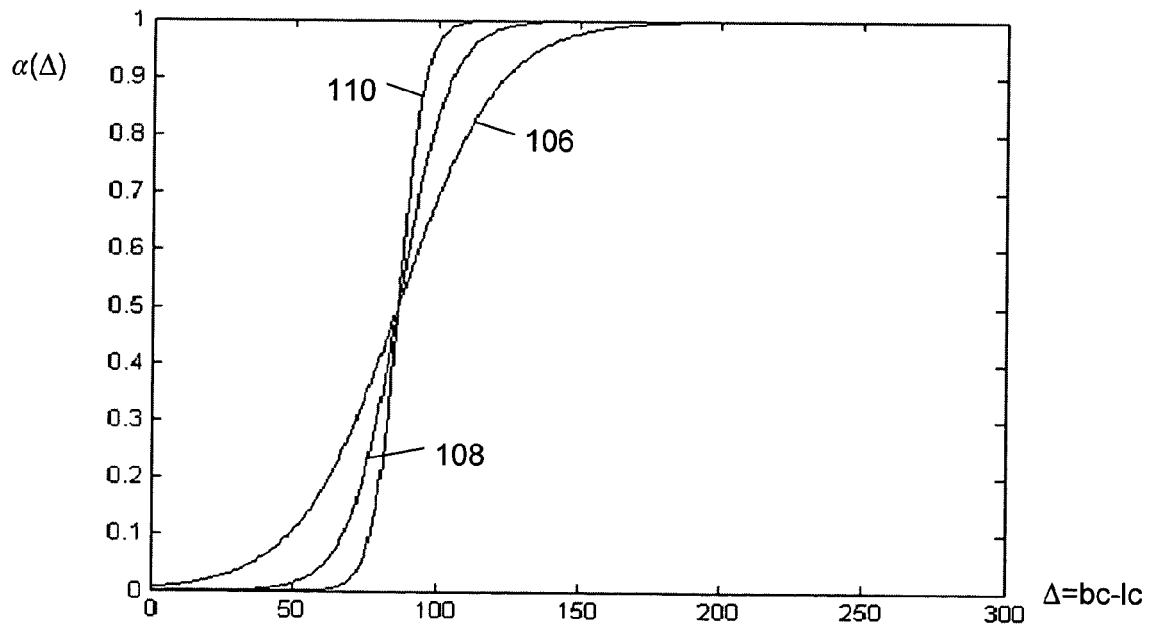
FIG. 9 are graphs of weighting values plotted as functions of contrast difference between measures of block contrast and local contrast computed for a pixel of a base image.

The weights generator module 100 inputs the difference (Δ) between the local and block contrast measures (i.e., Δ(x, y)=bc(x,y)−lc(x,y)) into a function α(Δ), which may be stored as a lookup table, to generate a value of α(Δ) in the range [0,1]. Three different weighting functions 106, 108, 110 are shown in FIG. 9. These functions correspond to the general function given by equation (5):

$$\alpha(\Delta) = \frac{1}{1 + e^{-(\Delta - T)/a}} \quad (5)$$

where a and T are variable parameters. A final lookup table for α(Δ), which was trained with test images using subjective evaluations and objective PSNR (Peak Signal-To-Noise Ratio) values, is provided in Table 2 below. This table is presented in "reading order" (i.e., left to right, top to bottom):

TABLE 2

Weights Lookup 0.000045, 0.000051, 0.000057, 0.000065, 0.000073, 0.000082, 0.000092,
0.000103, 0.000116, 0.000130, 0.000147, 0.000165, 0.000185, 0.000208,
0.000234, 0.000263, 0.000296, 0.000333, 0.000374, 0.000421, 0.000473,
0.000532, 0.000598, 0.000672, 0.000755, 0.000849, 0.000955, 0.001073,
0.001207, 0.001356, 0.001525, 0.001714, 0.001927, 0.002166, 0.002434,
0.002736, 0.003075, 0.003456, 0.003884, 0.004365, 0.004905, 0.005512,
0.006193, 0.006958, 0.007816, 0.008779, 0.009860, 0.011072, 0.012432,
0.013956, 0.015664, 0.017577, 0.019719, 0.022117, 0.024798, 0.027796,
0.031144, 0.034881, 0.039048, 0.043691, 0.048858, 0.054601, 0.060975,
0.068040, 0.075858, 0.084493, 0.094010, 0.104477, 0.115961, 0.128525,
0.142232, 0.157137, 0.173288, 0.190724, 0.209470, 0.229535, 0.250913,
0.273574, 0.297470, 0.322526, 0.348645, 0.375706, 0.403567, 0.432063,
0.461017, 0.490236, 0.519521, 0.548673, 0.577495, 0.605799, 0.633410,
0.660172, 0.685949, 0.710628, 0.734120, 0.756358, 0.777300, 0.796925,
0.815232, 0.832237, 0.847968, 0.862468, 0.875787, 0.887984, 0.899121,
0.909265, 0.918480, 0.926835, 0.934395, 0.941223, 0.947381, 0.952926,
0.957912, 0.962391, 0.966410, 0.970013, 0.973241, 0.976129, 0.978713,
0.981022, 0.983085, 0.984927, 0.986572, 0.988039, 0.989347, 0.990514,
0.991554, 0.992481, 0.993307, 0.994043, 0.994698, 0.995282, 0.995801,
0.996264, 0.996676, 0.997042, 0.997368, 0.997659, 0.997917, 0.998147,
0.998352, 0.998534, 0.998695, 0.998840, 0.998968, 0.999082, 0.999183,
0.999274, 0.999354, 0.999425, 0.999489, 0.999545, 0.999596, 0.999640,
0.999680, 0.999715, 0.999747, 0.999775, 0.999800, 0.999822, 0.999842,
0.999859, 0.999875, 0.999889, 0.999901, 0.999912, 0.999922, 0.999930,
0.999938, 0.999945, 0.999951, 0.999956, 0.999961, 0.999965, 0.999969,
0.999973, 0.999976, 0.999978, 0.999981, 0.999983, 0.999985, 0.999986,
0.999988, 0.999989, 0.999990, 0.999992, 0.999992, 0.999993, 0.999994,
0.999995, 0.999995, 0.999996, 0.999996, 0.999997, 0.999997, 0.999997,
0.999998, 0.999998, 0.999998, 0.999998, 0.999999, 0.999999, 0.999999,
0.999999, 0.999999, 0.999999, 0.999999, 0.999999, 0.999999, 0.999999,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000

Other embodiments are within the scope of the claims.

For example, although the above compression artifact reduction embodiments are described in connection with an image 12 that is compressed by a block-transform-based image compression method, these embodiments readily may be used to reduce artifacts in images compressed by other non-block-transform-based image compression techniques.

What is claimed is:

1. A method of processing an input image with a processor, comprising:
   applying a forward transform operation to a first shifted version of the input image to generate a first set of forward transform coefficients with the processor;
   applying the forward transform operation to a second shifted version of the input image that differs from the first shifted version to generate a second set of forward transform coefficients with the processor;
   applying first and second nonlinear transforms to the first and the second sets of forward transform coefficients, respectively, to generate first and second sets of nonlinearly transformed forward transform coefficients with the processor;
   computing first and second inverse transforms of the first and the second sets of nonlinearly transformed forward transform coefficients, respectively, to generate first and second intermediate images with the processor;
   computing first and second measures of local spatial intensity variability for first and second pixels, respectively, of the first and the second intermediate images, respectively, with the processor; and
   producing an output image from the first and the second intermediate images, wherein the output image includes an output pixel value that is computed from first and second pixel values corresponding to the first and the second pixels, respectively, and at least one of the first and the second measures of local spatial intensity variability with the processor.

2. The method of claim 1, wherein the forward transform is a block transform.

3. The method of claim 2, wherein the block transforms are two-dimensional block discrete cosine transforms.

4. The method of claim 1, wherein the first and the second sets of forward transform coefficients are nonlinearly transformed by setting to zero each coefficient with an absolute value below a respective threshold and leaving unchanged each coefficient with an absolute value equal to at least the respective threshold.

5. The method of claim 4, further comprising sharpening the first and the second sets of forward transform coefficients by increasing nonlinear transform parameters by respective factors that are larger for higher spatial frequency forward transform coefficients than for lower spatial frequency forward transform coefficients with the processor.

6. The method of claim 1, wherein computing the output image comprises computing a base image from a combination of the first and the second intermediate images, and wherein the base image includes a base pixel value that is computed from the first and the second pixel values with the processor.

7. The method of claim 6, wherein the base pixel value is an average of the first and the second pixel values.

8. A method of processing an input image with a processor, comprising:
   applying a forward transform operation to a first shifted version of the input image to generate a first set of forward transform coefficients with the processor;

applying the forward transform operation to a second shifted version of the input image that differs from the first shifted version to generate a second set of forward transform coefficients with the processor;

applying first and second nonlinear transforms to the first and the second sets of forward transform coefficients, respectively, to generate first and second sets of nonlinearly transformed forward transform coefficients with the processor;

computing first and second inverse transforms of the first and the second sets of nonlinearly transformed forward transform coefficients, respectively, to generate first and second intermediate images with the processor;

computing first and second measures of local spatial intensity variability for first and second pixels, respectively, of the first and the second intermediate images, respectively, with the processor;

computing a base image from a combination of the first and the second intermediate images, wherein the base image includes a base pixel value that is computed from the first and the second pixel values with the processor;

computing a ringing correction image from the first and the second intermediate images, wherein the ringing correction image includes a ringing correction pixel value that is computed from at least one of the first and the second measures of local spatial intensity variability with the processor; and producing an output image from the base image and the ringing correction image, wherein the output image includes an output pixel value that is computed from the base pixel value and the ringing correction pixel value with the processor.

9. The method of claim 8, wherein a ringing correction pixel corresponding to the ringing correction pixel value in the ringing correction image is associated with the first and the second pixels in the first and the second intermediate images.

10. The method of claim 9, further comprising assigning to the ringing correction pixel in the ringing correction image the first or the second pixel value corresponding to the one of the first and the second pixel having a lowest computed measure of local spatial intensity variability.

11. The method of claim 9, further comprising assigning to the ringing correction pixel in the ringing correction image the ringing correction pixel value corresponding to an average of the first and the second pixel values.

12. A method of processing an input image with a processor, comprising:

computing spatially-shifted forward transforms of the input image to generate respective sets of forward transform coefficients with the processor;

applying nonlinear transforms to the forward transform coefficients of each set with the processor;

computing inverse transforms of the sets of nonlinearly transformed forward transform coefficients to generate respective intermediate images with the processor;

computing respective measures of local spatial intensity variability for pixels of each of the intermediate images with the processor;

computing an output image with pixel values computed based at least in part on the computed measures of local spatial intensity variability, wherein computing the output image comprises computing a base image from a combination of intermediate images and further comprises computing a ringing correction image based at least in part on the computed measures of local spatial intensity variability, wherein the output image is computed by a weighted combination of the base image and the ringing correction image with the processor; and identifying transition regions in the base image comprising, for a given pixel in the base image, computing a measure of local contrast for a local region encompassing the given pixel and computing a measure of block contrast for a larger region of the base image encompassing the local region with the processor.

13. The method of claim 12, wherein the measures of local contrast and block contrast correspond to pixel ranges computed based on two concentric windows superimposed over pixels of the base image.

14. The method of claim 12, further comprising mapping the measures of local contrast and block contrast to weights corresponding to respective pixel contributions of the base image and the ringing correction image to pixels of the output image with the processor.

15. The method of claim 14, wherein the base image weight is $1-\alpha$, the ringing correction image weight is $\alpha$, and $\alpha$ has a value ranging from 0 to 1 that is larger for pixels with relatively high ratios of block contrast to local contrast and is smaller for pixels with relatively low ratios of block contrast to local contrast.

16. The method of claim 15, wherein $$\alpha(\Delta) = \frac{1}{1 + e^{-(\Delta - T)/a}}$$

where $\Delta$=block contrast-local contrast, and a and T are variable parameters.

17. The method of claim 12, wherein the base image contribution to the output image is greater than the ringing correction image contribution for pixels remote from transition regions in the base image.

18. The method of claim 12, wherein the base image contribution to the output image is greater than the ringing correction image contribution for pixels in transition regions in the base image.

19. The method of claim 12, wherein the base image contribution to the output image is less than the ringing correction image contribution for pixels adjacent to transition regions in the base image.

20. A system for processing an input image, comprising:
a processor; and
a memory accessible by the processor and including:
a forward transform module configured to apply a forward transform operation to a first shifted version of the input image to generate a first set of forward transform coefficients and apply the forward transform operation to a second shifted version of the input image that differs from the first shifted version to generate a second set of forward transform coefficients when executed by the processor;
a nonlinear denoiser module configured to apply first and second nonlinear transforms to the first and the second sets of forward transform coefficients, respectively, to generate first and second sets of nonlinearly transformed forward transform coefficients when executed by the processor;
an inverse transform module configured to compute first and second inverse transforms of the first and the second sets of nonlinearly transformed forward transform coefficients, respectively, to generate first and second intermediate images when executed by the processor; and an output image generator module configured to compute first and second measures of local spatial intensity variability for first and second pixels, respectively, of the first and the second intermediate images, respectively, and to produce an output image from the first and the second intermediate images when executed by the processor, wherein the output image generator module is configured to compute an output pixel value in the output image from first and second pixel values corresponding to the first and the second pixels, respectively, and at least one of the first and the second measures of local spatial intensity variability.

21. The system of claim 20, wherein the forward transform module computes first and second spatially-shifted block forward transforms.

22. The system of claim 21, wherein the block transforms are two-dimensional block discrete cosine transforms.

23. The system of claim 20, wherein the nonlinear denoiser module nonlinearly transforms the first and the second sets of forward transform coefficients by setting to zero each coefficient with an absolute value below a respective threshold and leaving unchanged each coefficient with an absolute value equal to at least the respective threshold.

24. The system of claim 23, wherein the nonlinear denoiser module sharpens the first and the second sets of forward transform coefficients by increasing nonlinear transform parameters by respective factors that are larger for higher spatial frequency forward transform coefficients than for lower spatial frequency forward transform coefficients.

25. The system of claim 20, wherein the output image generator module computes a base image from a combination of the first and the second intermediate images, and wherein the base image includes a base pixel value that is computed from the first and the second pixel values.

26. The system of claim 25, wherein the base pixel value is an average of the first and the second pixel values.

27. A system for processing an input image, comprising:
a processor; and
a memory accessible by the processor and including:
a forward transform module configured to compute spatially-shifted forward transforms of the input image to generate respective sets of forward transform coefficients when executed by the processor;
a nonlinear denoiser module configured to apply nonlinear transforms to the forward transform coefficients of each set when executed by the processor;
an inverse transform module configured to compute inverse transforms of the sets of nonlinearly transformed forward transform coefficients to generate respective intermediate images when executed by the processor; and
a output image generator module configured to, when executed by the processor, compute respective measures of local spatial intensity variability for pixels of each of the intermediate images and to compute an output image with pixel values computed based at least in part on the computed measures of local spatial intensity variability, wherein output image generator module computes a base image from a combination of intermediate images and computes a ringing correction image based at least in part on the computed measures of local spatial intensity variability;
wherein the output image generator module computes the output image by a weighted combination of the base image and the ringing correction image, and wherein the output image generator module identifies transition regions in the base image by, for a given pixel in the base image, computing a measure of local contrast for a local region encompassing the given pixel and computing a measure of block contrast for a larger region of the base image encompassing the local region.

28. The system of claim 27, wherein each pixel in the ringing correction image is associated with a corresponding pixel in each of the intermediate images.

29. The system of claim 28, wherein the output image generator module assigns to each pixel in the ringing correction image a value of a corresponding intermediate image pixel having a lowest computed measure of local spatial intensity variability of the corresponding intermediate image pixels.

30. The system of claim 28, wherein the output image generator module assigns to each pixel in the ringing correction image a value corresponding to an average of multiple corresponding intermediate image pixels in a lowest percentile of local spatial variability measures of the corresponding intermediate image pixels.

31. The system of claim 27, wherein the measures of local contrast and block contrast correspond to pixel ranges computed based on two concentric windows superimposed over pixels of the base image.

32. The system of claim 27, wherein the output image generator module maps the measures of local contrast and block contrast to weights corresponding to respective pixel contributions of the base image and the ringing correction image to pixels of the output image.

33. The system of claim 32, wherein the base image weight is $1-\alpha$, the ringing correction image weight is $\alpha$, and $\alpha$ has a value ranging from 0 to 1 that is larger for pixels with relatively high ratios of block contrast to local contrast and is smaller for pixels with relatively low ratios of block contrast to local contrast.

34. The system of claim 33, wherein $$\alpha(\Delta) = \frac{1}{1 + e^{-(\Delta-T)/a}}$$

where $\Delta$=block contrast-local contrast, and a and T are variable parameters.

35. The system of claim 27, wherein the base image contribution to the output image is greater than the ringing correction image contribution for pixels remote from transition regions in the base image.

36. The system of claim 27, wherein the base image contribution to the output image is greater than the ringing correction image contribution for pixels in transition regions in the base image.

37. The system of claim 27, wherein the base image contribution to the output image is less than the ringing correction image contribution for pixels adjacent to transition regions in the base image.

38. A system for processing an input image, comprising:
a processor; and
a memory accessible by the processor and including:
means for applying a forward transform operation to a first shifted version of the input image to generate a first set of forward transform coefficients when executed by the processor;
means for applying the forward transform operation to a second shifted version of the input image that differs from the first shifted version to generate a second set of forward transform coefficients when executed by the processor;

means for applying first and second nonlinear transforms to the first and the second sets of forward transform coefficients, respectively, to generate first and second sets of nonlinearly transformed forward transform coefficients when executed by the processor;

means for computing first and second inverse transforms of the first and the second sets of nonlinearly transformed forward transform coefficients, respectively, to generate first and second intermediate images when executed by the processor;

means for computing first and second respective measures of local spatial intensity variability for for first and second pixels, respectively, of the first and the second intermediate images, respectively, when executed by the processor; and means for producing an output image from the first and the second intermediate images, wherein the output image includes an output pixel value that is computed from first and second pixel values corresponding to the first and the second pixels, respectively, and at least one of the first and the second measures of local spatial intensity variability when executed by the processor.

39. A computer-readable medium storing computer-readable instructions for causing a computer to:

apply a forward transform operation to a first shifted version of the input image to generate a first set of forward transform coefficients;

apply the forward transform operation to a second shifted version of the input image that differs from the first shifted version to generate a second set of forward transform coefficients;

apply first and second nonlinear transforms to the first and the second sets of forward transform coefficients, respectively, to generate first and second sets of nonlinearly transformed forward transform coefficients;

compute first and second inverse transforms of the first and the second sets of nonlinearly transformed forward transform coefficients, respectively, to generate first and second intermediate images;

compute first and second measures of local spatial intensity variability for for first and second pixels, respectively, of the first and the second intermediate images, respectively; and produce an output image from the first and the second intermediate images, wherein the output image includes an output pixel value that is computed from first and second pixel values corresponding to the first and the second pixels, respectively, and at least one of the first and the second measures of local spatial intensity variability.

* * * * *

UNITED STATES PATENT AND TRADEMARK OFFICE
CERTIFICATE OF CORRECTION

| | | |
|---|---|---|
| PATENT NO. | : 7,643,688 B2 | Page 1 of 1 |
| APPLICATION NO. | : 10/683322 | |
| DATED | : January 5, 2010 | |
| INVENTOR(S) | : Ramin Samadani et al. | |

It is certified that error appears in the above-identified patent and that said Letters Patent is hereby corrected as shown below:

In column 10, line 31, in Claim 16, delete "contrast-local" and insert -- contrast – local --, therefor.

In column 11, line 52, in Claim 27, delete "a" and insert -- an --, therefor.

In column 12, line 42, in Claim 34, delete "contrast-local" and insert -- contrast – local --, therefor.

In column 13, line 12, in Claim 38, before "first" delete "for".

In column 14, line 15, in Claim 39, before "first" delete "for".

Signed and Sealed this

Fifteenth Day of June, 2010

David J. Kappos
*Director of the United States Patent and Trademark Office*